United States Patent

Hossenlopp

[11] 3,949,032
[45] Apr. 6, 1976

[54] TEMPERATURE STABLE FERRITE FM TUNING CORE
[75] Inventor: Arthur M. Hossenlopp, Kokomo, Ind.
[73] Assignee: General Motors Corporation, Detroit, Mich.
[22] Filed: May 8, 1974
[21] Appl. No.: 467,930

Related U.S. Application Data
[63] Continuation-in-part of Ser. No. 381,180, July 20, 1973, abandoned.

[52] U.S. Cl. .............. 264/61; 252/62.62; 264/104
[51] Int. Cl.² .......................................... C04B 35/26
[58] Field of Search ........ 252/62.56, 62.62; 264/61, 264/104, 332

[56] References Cited
UNITED STATES PATENTS
3,036,009    5/1962    Zerbes ........................... 252/62.56

Primary Examiner—Donald J. Arnold
Assistant Examiner—John Parrish
Attorney, Agent, or Firm—Robert J. Wallace

[57] ABSTRACT

A ferrite FM tuning core and a method of producing it. The ferrite tuning core is physically and electrically interchangeable with a powdered iron FM tuning core but exhibits a substantially lower temperature coefficient of permeability. The tuning core is a nickel-zinc ferrite containing, in mol percent, 65–70% ferric oxide, 25–30% nickel oxide, and 4.5–5.5% zinc oxide. In the method, the oxides forming the ferrite are pressed into a solid cylindrical body, and the body is heated at a rate of about 5°–15°F per minute to a maximum temperature of about 2000°–2100°F. Upon reaching the maximum temperature the ferrite body is immediately allowed to cool at a rate of about 1.5°–2.0°F per minute to a temperature below about 400°F.

1 Claim, 2 Drawing Figures

TEMPERATURE STABLE FERRITE FM TUNING CORE

CROSS REFERENCE TO RELATED APPLICATIONS

This is a continuation-in-part of United States application Ser. No. 381,180, entitled "Temperature Stable Ferrites", filed July 20, 1973, now abandoned.

BACKGROUND OF THE INVENTION

This invention relates to inductor materials having exceptional temperature stability. More particularly, it involves a nickel-zinc ferrite FM tuning core which is interchangeable with a powdered iron core, yet which has a substantially lower temperature coefficient of permeability.

In tuned circuit applications it has been commonplace to provide a core having a high magnetic permeability which can be inserted into a tuning coil to increase or decrease the inductance thereof depending upon the degree of insertion. Powdered iron cores have been commonly used in FM tuning applications fairly successfully. However, one disadvantage of the powdered iron core is that its magnetic permeability varies with temperature. This can present a problem in applications where the iron core is subjected to wide temperature fluctuations. For example, in automotive radio applications the range of temperatures to which the core can be subjected is approximately −36°F to 186°F.

Until now the powdered iron core, even with this limitation, has been one of the most practical materials for automotive radio applications. Hence, many FM automotive radio tuning circuits have been designed for its use therein, taking into account its various magnetic properties such as permeability, etc. I have discovered a particular nickel-zinc ferrite composition that can be used to make a tuning core that is interchangeable with a powdered iron core. The ferrite core of my invention has magnetic properties almost identical to that of a powdered iron core except that the ferrite core of my invention has a substantially lower temperature coefficient of permeability. Therefore, my ferrite core can be interchanged with a powdered iron FM tuning core without the necessity of redesigning the electrical tuning circuitry. This means that the temperature stability of an FM tuning circuit can be increased merely by substituting a ferrite core made in accordance with my invention for the powdered iron core for which the circuit has been designed. Consequently, a gain in radio performance may be had without the loss of time and expense of circuit redesign.

I recognize that ferrite bodies of various compositions have been used as inductor materials. For example, U.S. Pat. No. 3,142,645 Zerbes discloses a nickel-zinc ferrite composition having 2–31.5% ZnO, 2–29.5% NiO, and 66.5–80% $Fe_2O_3$ with the addition of 0.1–3% CoO. U.S. Pat. No. 3,242,089 Bartow et al discloses a nickel-zinc ferrite composition of 1–40% ZnO, 1–40% NiO, and 50–89% $Fe_2O_3$ with the addition of 0.1–3% CoO. However, none of the prior art recognizes that a very specific nickel-zinc ferrite composition, namely 4.5–5.5% ZnO, 25–30% NiO, and 65–70% $Fe_2O_3$, will display the same magnetic characteristics of a powdered iron tuning core. This specific ferrite composition permits a radio manufacturer to merely replace the old powdered iron core with the ferrite core of this invention without having to redesign the radio tuning circuitry, and yet gain a substantial improvement of radio performance. This feature is particularly attractive to high volume manufacturers who have already spent a considerable amount of money for circuit design, and have well established production facilities which have been adapted to that circuit design which has proved highly reliable over the course of time. Conceivably, the prior art ferrite compositions can be used as an FM radio tuning core, yet in order to incorporate them into the radio considerable expense must be had to redesign the circuitry to adjust to their different magnetic properties.

OBJECTS AND SUMMARY OF THE INVENTION

Therefore, it is an object of this invention to provide a ferrite FM tuning core which is physically and electronically interchangeable with a powdered iron FM tuning core without requiring circuit redesign but yet which has a substantially lower temperature coefficient of permeability.

Another object of this invention is to provide a method of producing a nickel-zinc ferrite FM tuning core which can be physically and electronically interchanged with a powdered iron core without requiring redesigning of the electrical tuning circuitry.

These and other objects of the invention are achieved with an FM tuning core of a nickel-zinc ferrite containing, in mol percent, 65–70% ferric oxide, 25–30% nickel oxide, and 4.5–5.5% zinc oxide. A mixture of these oxides is compressed at a pressure of 10,000 to 20,000 psi into a solid, cylindrical body. The ceramic body is heated at a rate of about 5°–15°F per minute to a maximum temperature of about 2000°–2100°F. Upon reaching the maximum temperature the body is immediately allowed to cool at a rate of about 1.5°–2.0°F per minute to a temperature of less than approximately 400°F.

DESCRIPTION OF THE PREFERRED EMBODIMENT

Figure 1:
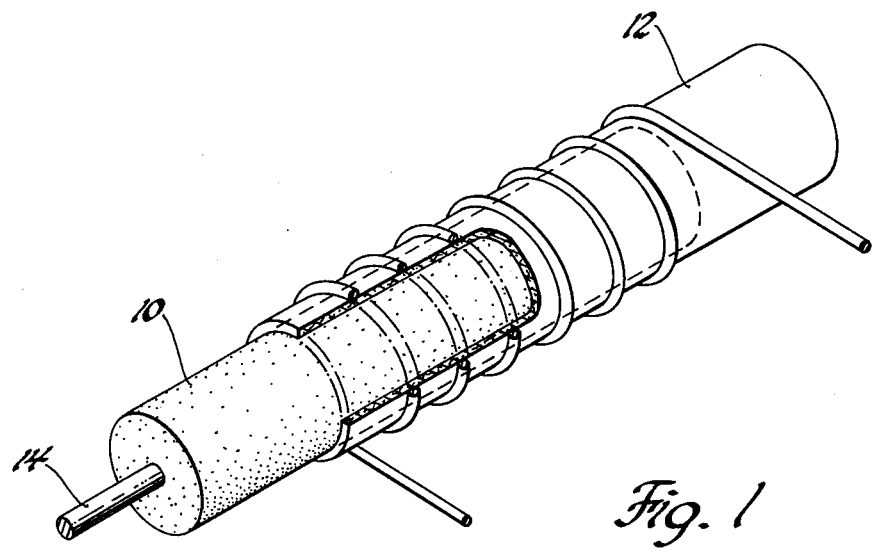
FIG. 1 is an isometric view in partial section showing a nickel-zinc ferrite core made in accordance with this invention which is partially inserted in an FM tuning coil.

Referring now to the drawings, FIG. 1 shows a tuning core 10 partially inserted into FM tuning coil 12. Rod 14 attached to one end of tuning core 10 provides means for translationally positioning core 10 at a desired insertion level to regulate the inductance of the tuning coil 12. Core 10 is a solid, cylindrical, ceramic body approximately 1.15 inches long and about 0.18 inch in diameter. It should be understood that core 10 may also have cross-sectional shapes other than circular. For example, the cross section of core 10 may have an octagonal or hexagonal shape if desired. Core 10 is a nickel-zinc ferrite such as the hereinafter described Example A or Example B.

Example A is a nickel-zinc ferrite containing, in mol percent, 70% ferric oxide ($Fe_2O_3$), 25% nickel-oxide (NiO), and 5% zinc oxide (ZnO). Example B is a nickel-zinc ferrite containing, in mol percent, 65% ferric oxide ($Fe_2O_3$), 30% nickel oxide (NiO), and 5% zinc oxide (ZnO).

Figure 2:
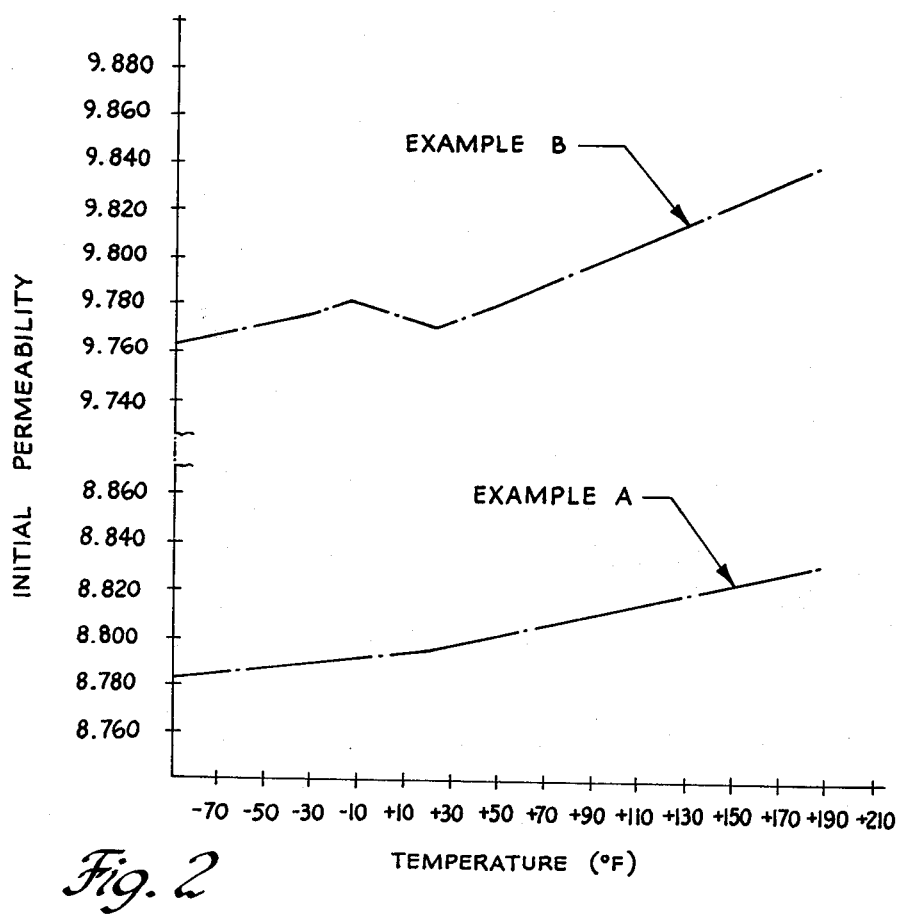
FIG. 2 is a graph of initial permeability versus temperature for two ferrite core examples made in accordance with this invention.

For ease of testing the magnetic properties of the two samples, toroids were made containing the above compositions. As one can see in FIG. 2, Example A which contains a higher ferric oxide percentage is more temperature stable than Example B which has a higher initial permeability than Example A. I have found that about 65–70 mol percent ferric oxide coupled with the relatively low zinc oxide proportion of 4.5–5.5%, is the upper and lower limit of the nickel-zinc ferrite composition which possesses magnetic properties that make the core interchangeable with a powdered iron core. Further addition of ferric oxide would improve temperature stability but decreases the initial permeability to an impractical level. On the other hand, an increase in ferric oxide proportion beyond 70 mol percent increases initial permeability but deteriorates temperature stability.

Both Example A and Example B have extremely low temperature coefficient of permeability. Temperature coefficient of permeability for the Examples were calculated according to the formula:

$$TC = \frac{\Delta Uo}{Uo \, \Delta T} \times 100 \; (\%/°F)$$

where TC is temperature coefficient of permeability, Uo is initial permeability, and T is temperature in °F. Example B has a temperature coefficient of permeability of about 0.00364% per degree Fahrenheit between −36°F and 186°F, while Example A has a TC of about 0.00225% per degree Fahrenheit.

According to my invention, both Examples were prepared by placing a mixture of the desired molar ratios of ferric oxide, nickel oxide, and zinc oxide into a porcelain jar containing 600 cc of methyl alcohol for ball milling. To prepare a 300 gram mixture of Example A, 249.28 grams of $Fe_2O_3$, 41.64 grams of NiO, and 9.07 grams of ZnO were used. The mixture was milled by a plurality of steel balls for 22 hours, removed from the jar, and air dried in an open pan. The steel balls were then separated from the mixture and a temporary organic binder blended in. The temporary binder can be a wax emulsion in water such as that known under the trade name as Hyform 1201 distributed by the American Cyanimid Company.

After blending in the temporary binder, the powder was passed through a 20 mesh screen and oven dried at 65°C. A powdered wax lubricant, such as Acrawax C from Glyco Chemicals Division of Charles L. Huesking Company, was then added to the powder.

The powder was then pressed in a suitable steel die to form a solid, cylindrical tuning core approximately 1.15 inches long and 0.19 inch in diameter. The forming pressure was approximately 10,000–20,000 psi. The core was removed from the die, and the wax binder and lubricant removed by heating in an oven to 220°C for approximately 24 hours.

The core was then fired in an electric furnace having a fused silica furnace tube providing a firing chamber. Opposite ends of the furnace tube were open to the ambient atmosphere. The firing chamber was preheated to about 200°F and the core was placed within it. The furnace temperature was then slowly increased. When the firing chamber reached approximately 1350°F, the opposite ends of the furnace tube were closed. The slow heating was continued until the firing chamber reached a maximum temperature of about 2000°F–2100°F. Furnace heating was then discontinued. The firing chamber reached this maximum temperature after about four hours of furnace heating. The rate of slow heating is not especially critical, and average temperature rise of about 5°–15°F per minute over a time period of 3–5 hours can generally be used to obtain satisfactory results.

Essential to my invention is that upon reaching the maximum temperature of about 2000°–2100°F, the furnace was immediately shut off so that there is zero soak time at the maximum temperature. By soak time, I mean the time for which the core is heated at the maximum temperature. I have found that if soak time is increased, the permeability increases while the temperature stability decreases. In order to produce a ferrite tuning core which has magnetic properties almost identical to that of a powdered iron core, and yet which has substantially more temperature stability, the soak time must be kept as small as possible.

The cores remain in the furnace after it is turned off upon reaching the maximum temperature, and are gradually cooled in the furnace to a temperature of about 400°F. This cooling takes place over a time period of 14–18 hours for an average cooling rate of 1.5°–2.0°F per minute. The precise rate of cooling is not essential to my invention and satisfactory results may be had by usual cooling rates practiced within the art. The cores are then removed from the furnace and further cooled at room air to ambient temperature. Suitable mechanisms such as rod 14 may be attached to the cores which are now ready for FM tuning core applications.

These nickel-zinc ferrites containing the precise aforesaid composition have magnetic properties such as initial permeability which are very similar to that of a powdered iron FM tuning core. However, the nickel-zinc ferrite cores made in accordance with my invention have an approximately 40% lower temperature coefficient of permeability. Therefore, they may be electronically and physically interchanged with a powdered iron core to give an FM tuning circuit greater temperature stability without the necessity of redesigning the circuitry.

While my invention was explained in connection with certain specific examples thereof, no limitation is intended thereby except as defined in the appended claims.

I claim:

1. A method of producing a nickel-zinc ferrite FM tuning core which is electronically and physically interchangeable with a powdered iron FM tuning core yet which has a substantially lower temperature coefficient of permeability than the powdered iron core, it being less than approximately 0.00364% per degree Fahrenheit over the temperature range between −36°F and +186°F, said method comprising the steps of:

blending together 65–70 mol percent ferric oxide, 25–30 mol percent nickel oxide, and 4.5–5.5 mol percent zinc oxide to form a mixture;

compressing said mixture at a pressure between 10,000–20,000 psi into a solid, elongated body;

heating said body at a rate of 5°–15°F per minute over a time period of 3–5 hours to a maximum temperature of about 2000°–2100°F;

immediately stopping any further heating upon reaching said maximum temperature;

slowly cooling said body at a rate of about 1.5°–2.0°F per minute to a temperature below about 400°F, and further cooling said body in room air to ambient temperature.

* * * * *